July 17, 1956     M. E. BOURNS     2,754,716

FASTENING PIN HAVING PLURALITY OF RESILIENT FINGERS

Filed May 31, 1955

INVENTOR.
Marlan E. Bourns
BY
HIS ATTORNEY

United States Patent Office 2,754,716
Patented July 17, 1956

2,754,716

FASTENING PIN HAVING PLURALITY OF RESILIENT FINGERS

Marlan E. Bourns, Riverside, Calif.

Application May 31, 1955, Serial No. 512,050

2 Claims. (Cl. 85—8.3)

The present invention relates to a new and improved fastening device for insertion within generally cylindrical openings in adjacent members so as to secure these members against undesired movement.

In the manufacture, assembly, and use of a number of different types of small articles and in particular electrical components, it is frequently desired to secure a number of adjacent members to one another so that these members are properly aligned and so that they are securely fastened against undesired movement. A number of devices have been employed for this purpose. Among such devices have been various solid pins, bolts, screws and the like. None of these prior devices are considered to be completely satisfactory for this type of use.

A fastening device to satisfactorily achieve the purposes indicated briefly in the foregoing must be capable of being easily installed within a number of aligned openings within adjacent members. Further, it must separately engage each of these adjacent members so as to prevent any motion of each of these members in the event that the holes within the members differ slightly in size. Also, a fastening device of the class described, to be acceptable, must be exceedingly simple and inexpensive to manufacture.

It is an object of this disclosure to teach the construction of new fastening devices having these characteristics. A further object of this invention is to provide fastening devices of the class described which may be easily and conveniently used by unskilled labor. Other objectives of this invention as well as many advantages of it will be apparent from the remainder of this specification, the appended claims and the accompanying drawings, in which:

In all figures of the drawings, like numerals are used to designate like parts. It is to be understood that the present invention is not to be considered as limited to fastening devices having the exact proportional shapes shown in the accompanying drawings inasmuch as a wide number of different fastening devices may be constructed in accordance with teachings of this invention without departing from the essential nature of the invention.

The essential features of the invention are of course fully summarized and defined by the appended claims forming a part of this disclosure. If desired, however, the present invention may be briefly summarized and defined as required by Rule 73 of the Rules of Practice of the United States Patent Office in patent cases, as being concerned with a fastening device having the general shape of a cylinder, this fastening device including: an elongated wall curved to the shape of a sector of a circle; and, a plurality of resilient fingers attached adjacent to one another to said elongated wall, said fingers each being curved to the shape of a sector of a circle, each of said fingers being adapted to engage the wall of an opening formed in a member being secured with a fastening device of the present invention. Unfortunately, a brief summary of this category is not considered to be sufficiently complete so as to appraise even those skilled in the art to which the invention pertains as to the precise nature of this invention.

Figure 1:
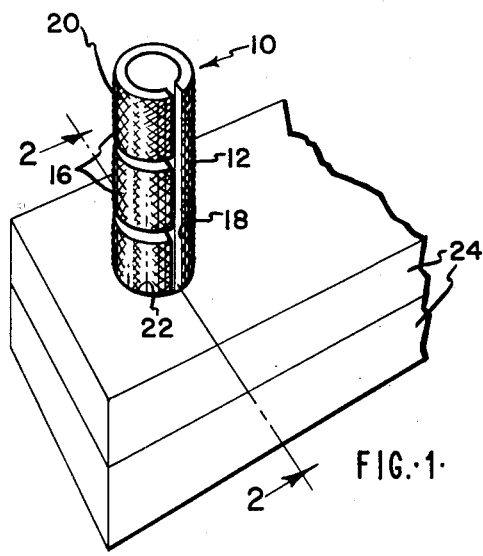
Fig. 1 is an isometric view of a fastening device of the present invention being employed for the purpose intended.
Figure 3:
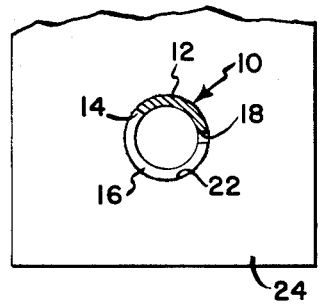
Fig. 3 is a cross-sectional view taken at line 3—3 of Fig. 2.

In Fig. 1 of the drawings a fastening device 10 of the present invention is shown. This complete fastening device is composed of a single sheet of resilient metal or the like and is so constructed so as to include an elongated wall 12. A cross-sectional view of this wall, as shown in Fig. 3 of the drawings, indicates that it is formed in the general shape of a sector of a circle or of a cylinder. Preferably, this sector is of less than 180° of a circle. Attached to an edge 14 of the wall 12 are a plurality of resilient fingers 16, each of which is also formed in the shape of a sector of the same circle, or cylinder, so that the ends thereof are spaced from the wall 12. Preferably, each of the fingers 16 is formed in the shape of a sector of more than 180° and less than 360° minus the number of degrees of a circle of the sector of the wall 12. Thus, with this construction the entire fastening device 10 is in the general shape of a cylinder provided with an edge slot 18 projecting the length of the cylinder parallel to the wall 12. If desired, the exterior of this cylinder, that is, the exterior of the fingers 14 and the wall 12, may be provided with serrations 20 which tend to hold the fastening device 10 in position when it is employed for the purpose intended.

The use of this fastening device 10 is best seen in Fig. 1 of the drawings. Here the fastening device is shown inserted within a series of aligned openings 22 formed within adjacent members 24, these members 24 being secured together against undesired movement through the use of this fastening device 10. The members 24 may be sheets or layers of different types of materials, or may be small members such as, for example, potentiometers and the like. In the latter case, the openings 22 are generally eyelets formed within these components.

The diameter of the complete fastening device 10, when it is not being employed for the purpose shown, is preferably slightly greater than the effective diameter of the opening or openings within which this fastening device is to be inserted. The insertion of the fastening device 10 is relatively simple; the fingers 14 are compressed slightly and the entire device is inserted within the openings in which it is being placed. The compression of the fingers 14 may conveniently take place by twisting the fastening device 10 in a direction which is the reverse of the direction from which the fingers 14 extend from the wall 12.

Figure 2:
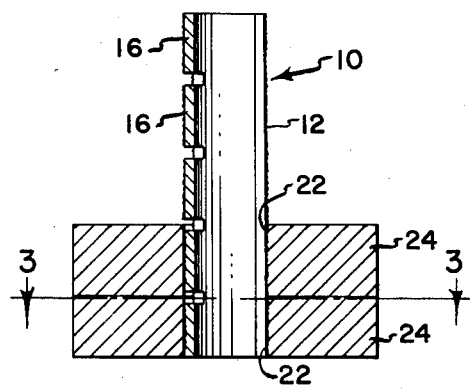
Fig. 2 is a cross-sectional view taken along line 2—2 of Fig. 1.

The advantages of the fastening device 10 are readily realized from a consideration of Fig. 2. Each of the fingers 16 engages the wall defining each of the openings 22. Thus, each of these fingers is free to adjust for any differential in size between these openings so as to firmly engage in a resilient manner the wall defining each opening, without reference to the size of the next adjacent opening. If the fastening device 10 is formed in the general shape of a cylinder having the edge slot 18 previously described but not having the resilient fingers 16, this fastening device would not be satisfactory for the purpose intended, since it is inevitable that some variation in hole diameters will occur. If desired, more than one of the fingers 16 may engage the wall defining each opening 22, although this is not necessary in the instant invention. In no case, however, should any of the fingers 16 be so dimensioned so as to extend from any one of the members 20 to an adjacent member.

Figure 4:
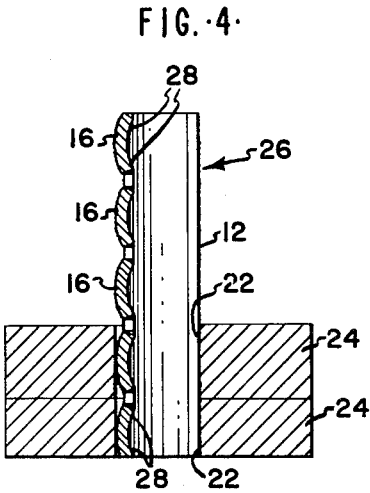
Fig. 4 is a cross-sectional view similar to Fig. 2 of a modified fastening device invention.

In Fig. 4 of the drawings a cross-sectional view is shown illustrating the formation of a modified fastening device of the present invention. This fastening device 26 is formed so that the individual fingers 16 previously described are provided with curved edges 28, these edges being curved towards the center of the fastening device 22. With this construction, the ease of use or assembly of the fastening device 26 is improved inasmuch as there is little if any tendency for the edges 28 to catch upon the edges of the wall defining the openings within members secured together.

Figure 5:
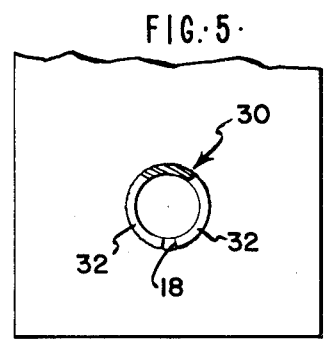
Fig. 5 is a cross-sectional view similar to Fig. 3 of a second modified fastening device of this invention.

In Fig. 5 of the drawings a second modified construction 30 of the invention is shown in which resilient fingers 32, similar to the fingers 16 previously described, are disposed along both side edges of the wall 12. The resilient fingers 16 lying within a single plane perpendicular to the axis of the fastening device are considerably smaller than resilient fingers previously described. This construction 30 shown in Fig. 5 of the drawings is of particular utility when it is desired to limit the resiliency of these fingers by limiting their length so as to achieve a firm engaging action when the device is employed for the purposes intended.

Those skilled in the art will note that the invention is capable of modification without departing from the scope of this disclosure. All such modifications are to be considered as part of the inventive concept insofar as they are within the skill of the art and are defined in the appended claims.

I claim:

1. A fastening device for securing a plurality of members with respect to one another, each of said members having an opening formed therein so as to project therethrough, said members being secured to one another so that said openings are aligned with one another and so that said members are held with respect to one another so as to be incapable of movement with respect to one another, said fastening device having the general shape of a cylinder of a larger diameter than said openings in said members and being capable of being reduced in diameter so as to fit within said openings and so as to project through said openings in order to engage the portions of said members defining said openings, holding said members with respect to one another so that said members are substantially incapable of movement with respect to one another, said fastening device being formed of a single sheet of resilient material and including: an elongated wall having edges, said wall being curved in the shape of sector of less than 180° of a circle; and a plurality of resilient fingers attached to one edge of said wall adjacent to one another so as to extend therefrom, each of said fingers having the shape of a sector of a circle of more than 180° and less than 360° minus the number of degrees of said circle corresponding to the shape of said elongated wall, said fingers being so designed so that each of said fingers is designed to be located within a single one of said openings within said members so that said fastening device is capable of being used in securing said members to one another in such a manner that each finger is capable of bending independently of each of said other fingers employed so as to allow for variation in the diameter of said openings within said members, the sides of said fingers adjacent one another are curved towards the center of said fastening device so that during insertion of said fastening device within a plurality of aligned openings within a plurality of members there is substantially no tendency for the edges of said fingers to catch upon the edges of said members surrounding said openings in order that said fastening device may be readily inserted into a desired operative position.

2. A fastening device as defined in claim 1 wherein the the exterior of said wall and said fingers are serrated so as to hold said fastening device securely in position against the portions of said members defining said openings.

References Cited in the file of this patent

UNITED STATES PATENTS 2,100,658     Finch  ---------------- Nov. 30, 1937